(12) United States Patent
Chang et al.

(10) Patent No.: US 10,558,359 B2
(45) Date of Patent: Feb. 11, 2020

(54) DEVICE AND METHOD FOR VIRTUAL STORAGE

(71) Applicant: BIGTERA LIMITED, Hong Kong (CN)

(72) Inventors: Cheng-Yue Chang, Taipei (TW); Jian-Ying Chen, Taipei (TW); Yung-Hua Chu, Taipei (TW); Kuan-Kai Chiu, Taipei (TW); Po-Hsun Yen, Taipei (TW); Tsung-Lin Yu, Taipei (TW); Ming-Xun Zhong, Taipei (TW)

(73) Assignee: SILICON MOTION TECHNOLOGY (HONG KONG) LTD., Kowloon (HK)

( * ) Notice: Subject to any disclaimer, the term of this patent is extended or adjusted under 35 U.S.C. 154(b) by 0 days.

(21) Appl. No.: 14/536,727

(22) Filed: Nov. 10, 2014

(65) Prior Publication Data
US 2016/0132244 A1 May 12, 2016

(51) Int. Cl.
*G06F 12/00* (2006.01)
*G06F 3/06* (2006.01)
*G06F 9/455* (2018.01)

(52) U.S. Cl.
CPC .......... *G06F 3/0604* (2013.01); *G06F 3/067* (2013.01); *G06F 3/0631* (2013.01); *G06F 3/0658* (2013.01); *G06F 3/0664* (2013.01); *G06F 3/0665* (2013.01); *G06F 9/45558* (2013.01); *G06F 2009/45583* (2013.01)

(58) Field of Classification Search
None
See application file for complete search history.

(56) References Cited

U.S. PATENT DOCUMENTS

| | | | | |
|---|---|---|---|---|
| 2013/0073702 A1* | 3/2013 | Umbehocker | ........ | G06F 9/5016 709/222 |
| 2014/0250439 A1* | 9/2014 | Parashar | ................. | G06F 9/505 718/104 |
| 2014/0289377 A1* | 9/2014 | Dutko | ................. | H04L 41/0803 709/220 |
| 2014/0293979 A1* | 10/2014 | Gormley | ............... | H04W 24/02 370/338 |
| 2014/0351809 A1* | 11/2014 | Chawla | ............... | G06F 9/45533 718/1 |

* cited by examiner

*Primary Examiner* — Daniel D Tsui
(74) *Attorney, Agent, or Firm* — McClure, Qualey & Rodack, LLP

(57) ABSTRACT

A device and a method for virtual storage are provided. The device includes a physical processor, a hypervisor and a physical storage. The hypervisor is executed on the physical processor and configured to create at least one client virtual machine and a controller virtual machine. The physical storage is clustered with physical storage of at least another device via the controller virtual machine to form a storage cluster. The controller virtual machine is further configured to define a virtual storage pool in the storage cluster and create at least one virtual storage controller virtual machine to interface the at least one client virtual machine with the virtual storage pool so that the at least one client virtual machine accesses the virtual storage pool via the at least one virtual storage controller virtual machine and the controller virtual machine. The method is applied to the device to implement the operations.

10 Claims, 3 Drawing Sheets

DEVICE AND METHOD FOR VIRTUAL STORAGE

CROSS-REFERENCES TO RELATED APPLICATIONS

Not applicable.

BACKGROUND OF THE INVENTION

Field of the Invention

The present invention relates to a device and a method for storage. In particular, the present invention relates to a device and a method for virtual storage.

Descriptions of the Related Art

Converged Datacenter Infrastructure has been the newest trend for cloud-based systems over recent years. Under this infrastructure, the computing tier is integrated with the storage tier on the same physical layer of a cloud-based system so that the space and cost necessary for the cloud-based system can be reduced greatly. However, this infrastructure does not support traditional storage array protocols such as a Network Attached Storage (NAS) protocol or a Storage Attachment Network (SAN) protocol, which is generally used for storage access and management. Therefore, it is not convenient for users to perform storage access and management under this infrastructure.

FIG. 1 is a schematic view of a cloud-based system under the Converged Datacenter Infrastructure. As shown in FIG. 1, the cloud-based system 1 may comprise a plurality of devices including a device 11 and at least one device 19 (i.e., one or more devices 19). The device 11 may comprise a physical processor 111 and physical storage 119. The device 11 may further comprise a hypervisor 113 executed on the physical processor 111. The hypervisor 113 may create at least one client virtual machine 115 and a controller virtual machine 117. The hypervisor 113, the at least one client virtual machine 115 and the controller virtual machine 117 belong to the computing tier of the device 11, while the physical storage 119 belongs to the storage tier of the device 11.

Likewise, each device 19 may comprise a physical processor and a hypervisor executed on the physical processor. In addition, the hypervisor of each device 19 may create at least one client virtual machine and a controller virtual machine 197. In addition, the hypervisor, the at least one client virtual machine and the controller virtual machine 197 belong to the computing tier of the corresponding device 19, while the physical storage 199 belongs to the storage tier of the corresponding device 19. For the sake of simplification, the hypervisor and the client virtual machine of each device 19 are not shown in FIG. 1. The devices 11 or 19 may be a computing device such as a computer, a notebook, a tablet, a smart cell phone, etc.

The physical storage 119 and all the physical storages 199 are clustered to form a storage cluster 20 via the connections among the controller virtual machine 117 and all the controller virtual machines 197. Under this infrastructure, if a user wants to access the storage cluster 20 of the device 11, he or she must use the at least one client virtual machine 115 to request the hypervisor 113 to instruct the controller virtual machine 117 to create a virtual storage space in the storage cluster 20. For example, the at least one client virtual machine 115 may create a virtual disc (not shown), while the hypervisor 113 may instruct the controller virtual machine 117 to create a virtual storage space with a virtual index (not shown) corresponding to the virtual disc in the storage cluster 20. Accordingly, under this infrastructure, storage access and management must be controlled by the hypervisor 113, which the virtualization infrastructure such as VMware Vsphere provides, so that the user cannot independently perform them based on traditional storage array protocols. In addition, the user cannot own and manage an independent storage space under this infrastructure.

In view of this, it is important to provide a storage access and management solution for cloud-based systems under the Converged Datacenter Infrastructure in the art.

SUMMARY OF THE INVENTION

An objective of the present invention is to provide a storage access and management solution for cloud-based systems under the Converged Datacenter Infrastructure in the art.

To achieve the objective, the present invention provides a device for virtual storage. The device comprises a physical processor, a hypervisor and physical storage. The hypervisor is executed on the physical processor and configured to create at least one client virtual machine and a controller virtual machine. The physical storage is clustered with physical storage of at least another device via the controller virtual machine to form a storage cluster. The controller virtual machine is further configured to define a virtual storage pool in the storage cluster and create at least one virtual storage controller virtual machine to interface the at least one client virtual machine with the virtual storage pool so that the at least one client virtual machine accesses the virtual storage pool via the at least one virtual storage controller virtual machine and the controller virtual machine.

To achieve the objective, the present invention also provides a method for virtual storage in a device. The device comprises a physical processor and physical storage. The method comprises the following steps: creating at least one client virtual machine and a controller virtual machine by a hypervisor executed on the physical processor; clustering the physical storage with physical storage of at least another device via the controller virtual machine to form a storage cluster; defining a virtual storage pool in the storage cluster by the controller virtual machine; and creating at least one virtual storage controller virtual machine by the controller virtual machine to interface the at least one client virtual machine with the virtual storage pool so that the at least one client virtual machine accesses the virtual storage pool via the at least one virtual storage controller virtual machine and the controller virtual machine.

According to the above descriptions, the present invention provides a device and a method for virtual storage. In the present invention, the controller virtual machine may create at least one virtual storage controller virtual machine configured to interface the at least one client virtual machine with the virtual storage pool defined in the storage cluster so that users can use the at least one client virtual machine to accesses and manage the virtual storage pool via the at least one virtual storage controller virtual machine and the controller virtual machine without control of the hypervisor. Therefore, the present invention provides a storage access and management solution for cloud-based systems under the Converged Datacenter Infrastructure in the art.

The detailed technology and preferred embodiments implemented for the present invention are described in the following paragraphs accompanying the appended drawings for persons skilled in this field to well appreciate the features of the claimed invention.

BRIEF DESCRIPTION OF THE DRAWINGS

A brief description of drawings is made as follows, but this is not intended to limit the present invention.

DESCRIPTION OF THE PREFERRED EMBODIMENT

Figure 1:
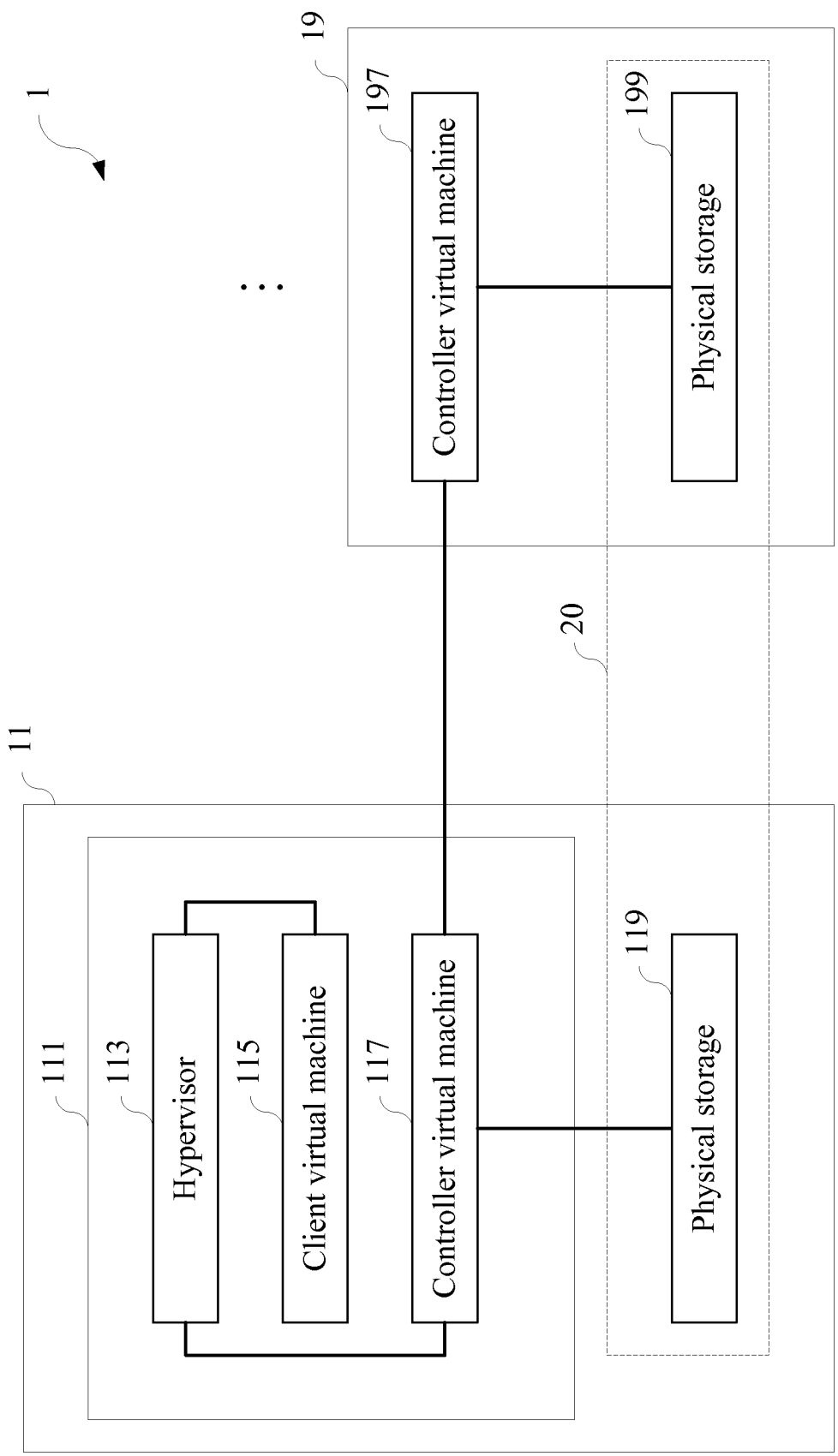
FIG. 1 is a schematic view of a cloud-based system under the Converged Datacenter Infrastructure.

The present invention will be explained with reference to embodiments thereof. However, the following embodiments are not intended to limit the present invention to any environments, applications, structures, process flows, or steps as described in these embodiments. In other words, the description of the following embodiments is only for the purpose of explaining the present invention rather than to limit the present invention. In the drawings, elements not directly related to the present invention are all omitted from depiction; and dimensional relationships among individual elements in the drawings are illustrated only for ease of understanding but not to limit the actual scale.

Figure 2:
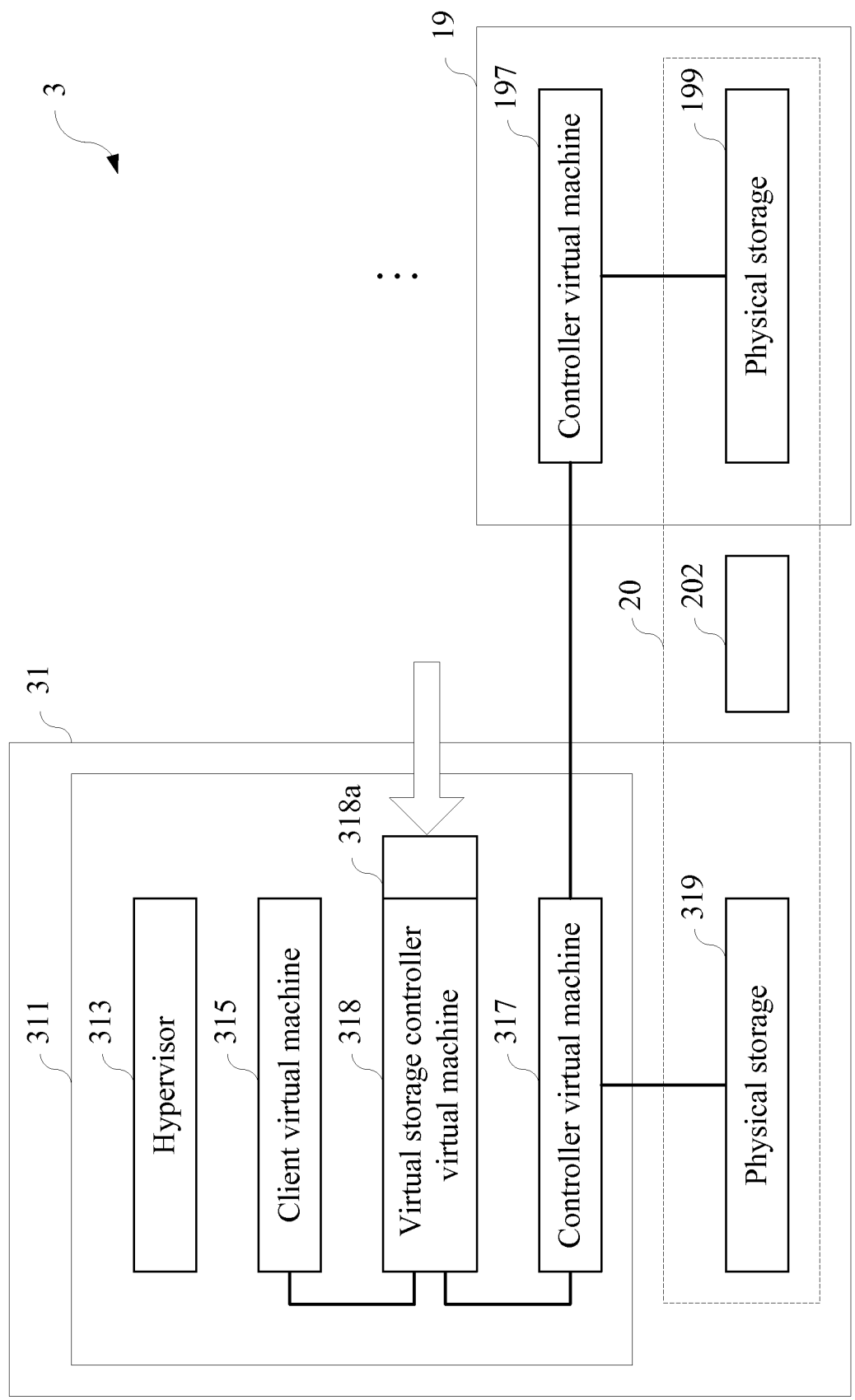
FIG. 2 is a schematic view of a cloud-based system according to an embodiment of the present invention.

An embodiment of the present invention (briefly called "a first embodiment") is a cloud-based system. FIG. 2 is a schematic view of the cloud-based system according to the present invention. As shown in FIG. 2, the cloud-based system 3 may comprise a plurality of devices including a device 31 and at least one device 19 (i.e., one or more devices 19). The device 31 may comprise a physical processor 311 and physical storage 319. The device 31 may further comprise a hypervisor 313 executed on the physical processor 311. The hypervisor 313 may create at least one client virtual machine 315 and a controller virtual machine 317. The hypervisor 313, the at least one client virtual machine 315 and the controller virtual machine 317 belong to the computing tier of the device 31, while the physical storage 319 belongs to the storage tier of the device 31.

Likewise, each device 19 may comprise a physical processor and a hypervisor executed on the physical processor. In addition, the hypervisor of each device 19 may create at least one client virtual machine and a controller virtual machine 197. In addition, the hypervisor, the at least one client virtual machine and the controller virtual machine 197 belong to the computing tier of the corresponding device 19, while the physical storage 199 belongs to the storage tier of the corresponding device 19. For the sake of simplification, the hypervisor and the client virtual machine of each device 19 are not shown in FIG. 1. The devices 31 or 19 may be a computing device such as a computer, a notebook, a tablet, a smart cell phone, etc.

The physical storage 319 and all the physical storages 199 are clustered to form a storage cluster 20 via the connections among the controller virtual machine 317 and all the controller virtual machines 197. The controller virtual machine 317 may create at least one virtual storage controller virtual machine 318 to interface the at least one client virtual machine 315 with the virtual storage pool 202. The at least one virtual storage controller virtual machine 318 also belongs to the computing tier of the device 31. Under this infrastructure, if a user wants to access the storage cluster 20 of the device 31, the controller virtual machine 317 defines a virtual storage pool 202 in the storage cluster 20 according to the user's need so that the user can use the at least one client virtual machine 315 to accesses and manage the virtual storage pool 202 via the at least one virtual storage controller virtual machine 318 and the controller virtual machine 317 without control of the hypervisor 313.

In an exemplary example of this embodiment, the controller virtual machine 317 may create the at least one virtual storage controller virtual machine 318 according to a management application programming interface (API) provided by the hypervisor 313. For example, a cloud administrator can use the management API to instruct the controller virtual machine 317 to create a virtual machine and designate the created virtual machine as the at least one virtual storage controller virtual machine 318 of the device 31.

In an exemplary example of this embodiment, the controller virtual machine 317 may create the at least one virtual storage controller virtual machine 318 according to a storage array protocol so that the at least one client virtual machine 315 may communicate with the at least one virtual storage controller virtual machine 318 according to a storage array protocol. In addition, messages are sent between the at least one client virtual machine 315 and the at least one virtual storage controller virtual machine 318 according to the storage array protocol. The storage array protocol may be at least one of, for example, a Network Attached Storage (NAS) protocol and a Storage Attachment Network (SAN) protocol. Note that the controller virtual machine 317 may also create the at least one virtual storage controller virtual machine 318 according to other well-known storage array protocols.

In an exemplary example of this embodiment, the at least one virtual storage controller virtual machine 318 may further generate and provide a user management interface 318a used to manage the at least one client virtual machine 315 and the virtual storage pool 202 for a user. For example, the user may use the user management interface 318a to create access accounts for storage access and manage the respective authorities of accessing the virtual storage pool 202. The user may also use the user management interface 318a to determine what kind of storage array protocol is adapted to the communication between the at least one client virtual machine 315 and the at least one virtual storage controller virtual machine 318. The user may further use the user management interface 318a to determine the Quality of Service (QoS) of storage access. Note that the user may still use the user management interface 318a to do various management other than the above descriptions.

Figure 3:
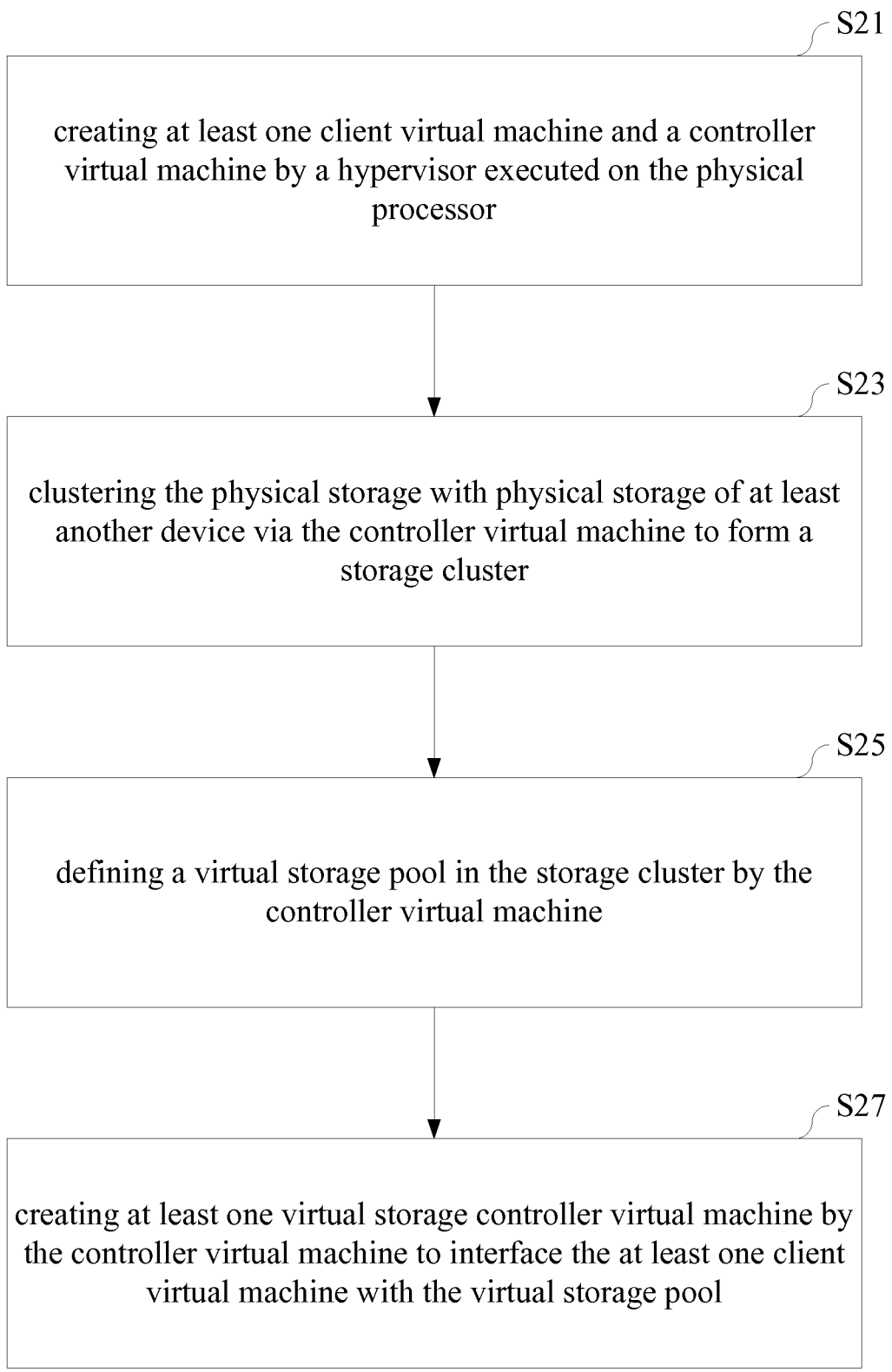
FIG. 3 is a schematic view illustrating a method for virtual storage in a device according to an embodiment of the present invention.

An embodiment of the present invention (briefly called "a second embodiment") is a method for virtual storage in a device. The device may be considered as the device 31 of the previously embodiment. The device may comprise a physical processor and physical storage. FIG. 3 is a schematic view illustrating the method according to the present invention. As shown in FIG. 3, the method comprises the following steps: a step S21 of creating at least one client virtual machine and a controller virtual machine by a hypervisor executed on the physical processor; a step S23 of clustering the physical storage with physical storage of at least another device via the controller virtual machine to form a storage cluster; a step S25 of defining a virtual storage pool in the storage cluster by the controller virtual machine; and a step S27 of creating at least one virtual storage controller virtual machine by the controller virtual machine to interface the at least one client virtual machine with the virtual storage pool so that the at least one client virtual machine accesses the virtual storage pool via the at least one virtual storage controller virtual machine and the controller virtual machine. The order in which the steps S21~S27 are presented is not intended to limit the present invention, and can be adjusted appropriately without departing from the spirit of the present invention.

In an exemplary example of this embodiment, the method further comprises the following step: providing a user management interface used to manage the at least one client virtual machine and the virtual storage pool for a user by the at least one virtual storage controller virtual machine.

In an exemplary example of this embodiment, the step of creating the at least one client virtual machine further comprise the following step: creating the at least one virtual storage controller virtual machine by the controller virtual machine according to a management application programming interface provided by the hypervisor.

In an exemplary example of this embodiment, the at least one client virtual machine communicates with the at least one virtual storage controller virtual machine according to a storage array protocol.

In an exemplary example of this embodiment, the at least one client virtual machine communicates with the at least one virtual storage controller virtual machine according to a storage array protocol. In addition, the storage array protocol comprises at least one of a Network Attached Storage protocol and a Storage Attachment Network protocol.

In addition to what has been described above, the method further comprises the steps corresponding to other operations of the device 31 set forth in the first embodiment. The way in which the method executes these corresponding steps that are not disclosed in the second embodiment can be readily appreciated by persons of ordinary skill in the art based on the related disclosure of the first embodiment, and thus, will not be further described herein.

According to the above descriptions, the present invention provides a device and a method for virtual storage. In the present invention, the controller virtual machine may create at least one virtual storage controller virtual machine configured to interface the at least one client virtual machine with the virtual storage pool defined in the storage cluster so that users can use the at least one client virtual machine to access and manage the virtual storage pool via the at least one virtual storage controller virtual machine and the controller virtual machine without control of the hypervisor. Therefore, the present invention provides a storage access and management solution for cloud-based systems under the Converged Datacenter Infrastructure in the art.

The above disclosure is related to the detailed technical contents and inventive features thereof. Persons skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A device for virtual storage, comprising:
a physical processor;
a hypervisor executed on the physical processor and configured to create at least one client virtual machine and a controller virtual machine; and
physical storage, clustered with physical storage of at least another device via the controller virtual machine to form a storage cluster;
wherein the controller virtual machine is further configured to define a virtual storage pool with customized properties in the storage cluster and create at least one virtual storage controller virtual machine to interface the at least one client virtual machine with the virtual storage pool without via the hypervisor so that the at least one client virtual machine accesses the virtual storage pool via the at least one virtual storage controller virtual machine and the controller virtual machine; and
wherein the at least one virtual storage controller virtual machine further creates a user management interface dedicated for a user to create access accounts for storage access, to manage respective authorities of the access accounts for accessing the virtual storage pool and to determine a storage array protocol for the communication between the at least one client virtual machine and the at least one virtual storage controller virtual machine, so that the user accesses the virtual storage pool via the at least one virtual storage controller machine.

2. The device as claimed in claim 1, wherein the controller virtual machine creates the at least one virtual storage controller virtual machine according to a management application programming interface provided by the hypervisor.

3. The device as claimed in claim 1, wherein the at least one client virtual machine communicates with the at least one virtual storage controller virtual machine according to a storage array protocol.

4. The device as claimed in claim 3, wherein the storage array protocol comprises at least one of a Network Attached Storage (NAS) protocol and a Storage Attachment Network (SAN) protocol.

5. A method for virtual storage in a device, the device comprising a physical processor and physical storage, the method comprising the following steps:
creating at least one client virtual machine and a controller virtual machine by a hypervisor executed on the physical processor;
clustering the physical storage with physical storage of at least another device via the controller virtual machine to form a storage cluster;
defining a virtual storage pool with customized properties in the storage cluster by the controller virtual machine; and
creating at least one virtual storage controller virtual machine by the controller virtual machine to interface the at least one client virtual machine with the virtual storage pool without via the hypervisor so that the at least one client virtual machine accesses the virtual storage pool via the at least one virtual storage controller virtual machines and the controller virtual machine; and
creating, by the at least one virtual storage controller virtual machine, a user management interface dedicated for a user to create access accounts for storage access, to manage respective authorities of the access accounts for accessing the virtual storage pool and to determine a storage array protocol for the communication between the at least one client virtual machine and the at least one virtual storage controller virtual machine, so that the user accesses the virtual storage pool via the at least one virtual storage controller machine.

6. The method as claimed in claim 5, wherein the controller virtual machine creates the at least one virtual storage controller virtual machine according to a management application programming interface provided by the hypervisor.

7. The method as claimed in claim 5, wherein the at least one client virtual machine communicates with the at least one virtual storage controller virtual machine according to a storage array protocol.

8. The method as claimed in claim 7, wherein the storage array protocol comprises at least one of a Network Attached Storage protocol and a Storage Attachment Network protocol.

9. The device as claimed in claim 1, wherein the plurality of virtual storage controller virtual machines belongs to a computing tier of the device.

10. The method as claimed in claim 5, wherein the plurality of virtual storage controller virtual machines belongs to a computing tier of the device.

* * * * *